A. H. PENCE.
GUANO DISTRIBUTER.
APPLICATION FILED MAY 13, 1912.
1,050,165.
Patented Jan. 14, 1913.
2 SHEETS—SHEET 1.
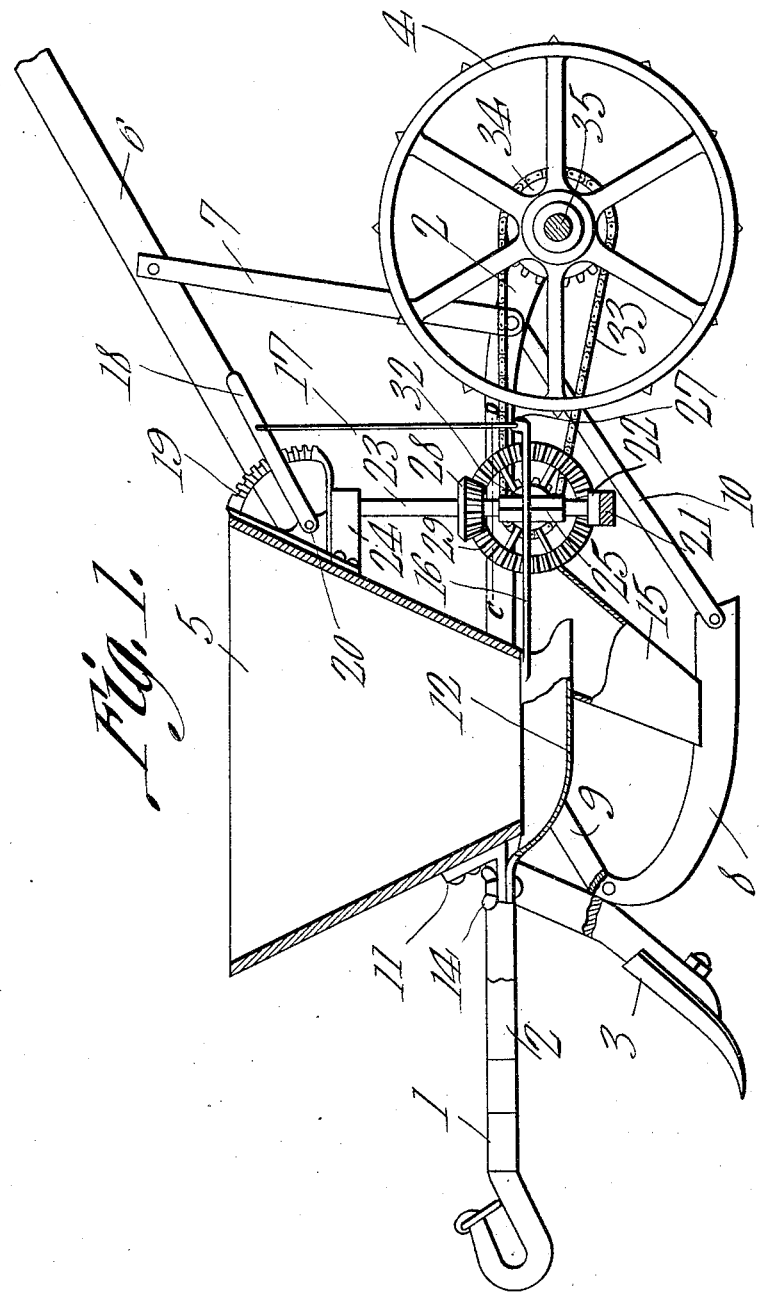
Witnesses
Alonzo H. Pence, Inventor
by C. A. Snow & Co.
Attorneys A. H. PENCE.
GUANO DISTRIBUTER.
APPLICATION FILED MAY 13, 1912.
1,050,165.
Patented Jan. 14, 1913.
2 SHEETS—SHEET 2.
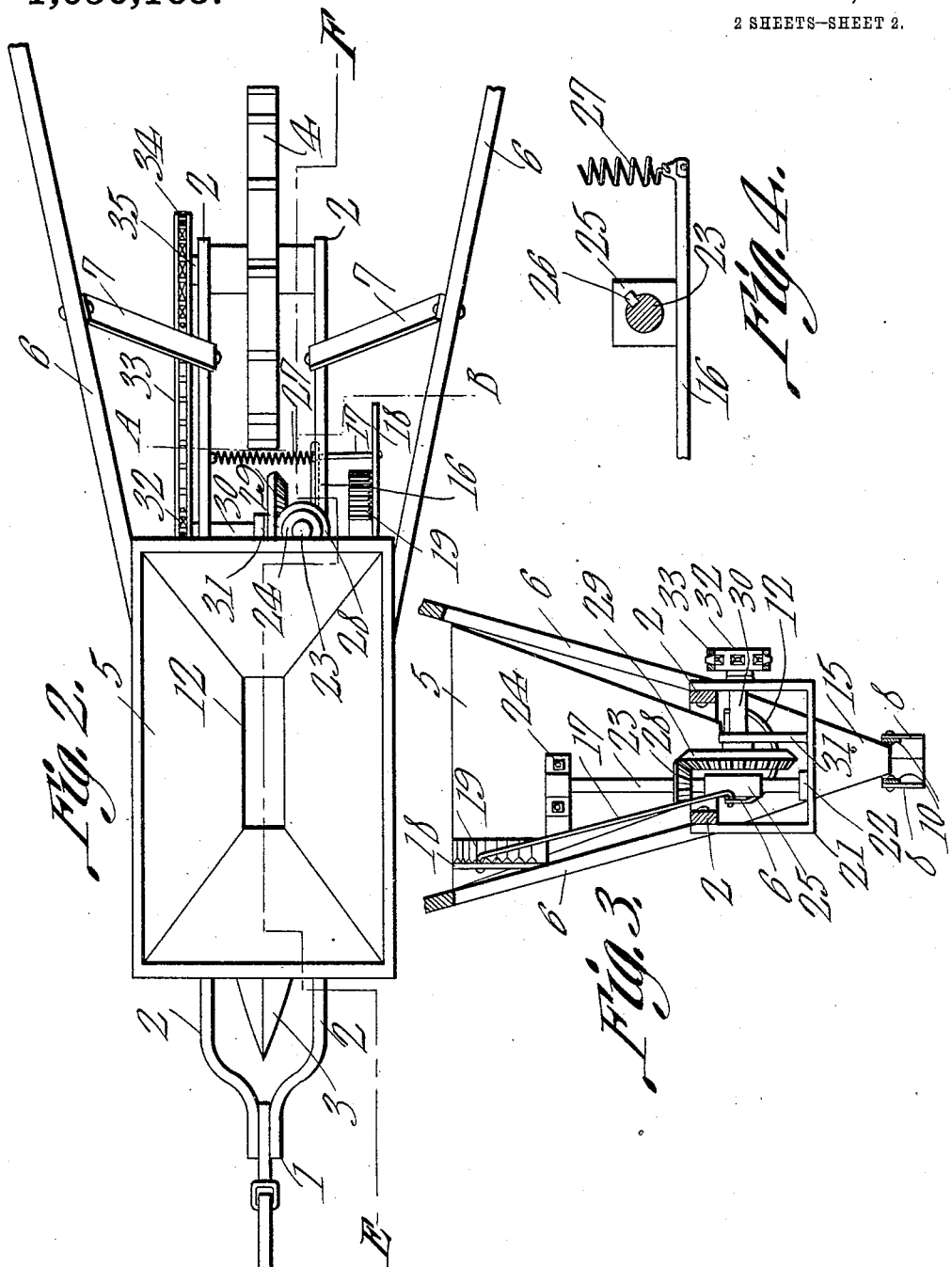
Alonzo H. Pence,
Inventor
Witnesses
by C. A. Snow & Co.
Attorneys

UNITED STATES PATENT OFFICE.

ALONZO H. PENCE, OF SOMERVILLE, ALABAMA.

GUANO-DISTRIBUTER.

1,050,165.  Specification of Letters Patent.  Patented Jan. 14, 1913.

Application filed May 13, 1912. Serial No. 697,005.

*To all whom it may concern:*

Be it known that I, ALONZO H. PENCE, a citizen of the United States, residing at Somerville, in the county of Morgan and State of Alabama, have invented a new and useful Guano-Distributer, of which the following is a specification.

The device forming the subject matter of this application, is adapted to be employed for distributing guano and the like.

The guano or other material passes from a fixed hopper into a distributing pan, and from the distributing pan through a chute into a shoe or furrow opener. A means is provided for tilting the distributer vertically, so as to increase or diminish the rate at which the material is delivered into the chute and furrow opener. The distributer is mounted for pivotal movement in a horizontal plane, and mechanism is provided whereby the ground wheel of the structure is made operative to oscillate the distributer horizontally. This mechanism for oscillating the distributer horizontally, consists of a polygonal shaft, driven by means of a belt and intermeshing pinions, from the ground wheel, and the distributer is spring-held against the polygonal shaft, so that, when the shaft rotates, the distributer will be moved rapidly, in a horizontal plane, with a sifting motion.

The objects of the invention are to provide a distributer which may be adjusted vertically, to regulate the amount of material deposited; and to provide novel means for imparting a horizontal oscillation to the distributer.

A further object of the invention is to improve generally, and to render more efficient, devices of the type to which the present invention appertains.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 is a vertical longitudinal section on the line E—F of Fig. 2, parts being removed and parts appearing in elevation; Fig. 2 is a top plan; Fig. 3 is a vertical transverse section upon the line A—B of Fig. 2; and Fig. 4 is a fragmental horizontal section upon the line C—D of Fig. 1.

In carrying out the invention, there is provided, as a primary and fundamental element, a wheel-mounted frame, denoted generally by the numeral 1. The frame 1 may consist of side bars 2, supporting, adjacent the forward portion of the frame, a shovel plow 3. Journaled for rotation between the rear ends of the side bars 2, is a ground wheel 4. The side bars 2 of the frame 1 support, between the shovel plow 3 and the ground wheel 4, a hopper 5. Handles 6 are provided, the same being secured to the frame 1, adjacent their forward ends, the handles 6 being suitably braced to the rear portion of the frame 1, as shown at 7.

The invention further includes a curved shoe or furrow opener, denoted generally by the numeral 8, and located to the rear of the shovel plow 3. The forward end of the shoe 8 is connected with the frame 1, as shown at 9, and braces 10 serve to unite the rear end of the shoe 8 with the rear portion of the frame. Carried by the lower, forward portion of the hopper 5, or supported upon the frame in any other desired manner, is an angle bracket 11. Located below the hopper 5 is a distributer 12, the same preferably taking the form of a pan, open at its rear end. The forward end of the pan or distributer 12 is pivotally connected with the angle bracket 11, through the instrumentality of a bolt and wing nut connection 14 or the like, the connection between the distributer 12 and the angle bracket 11 being a loose one, so that the distributer 12 may, at once, have horizontal movement, and, at the same time be subject to vertical adjustment. The rear end of the distributer 12 projects into a chute 15, which chute 15, in its turn, discharges into the shoe or furrow opener 8. The distributer 12 further includes a rearwardly extended arm 16, connected by means of a link 17, with a lever 18, adapted to engage a segment 19, the segment 19 being secured to the hopper 5. The lever 18 is fulcrumed upon the segment 19, as shown at 20.

Noting particularly Fig. 3, it will be seen that a yoke 21 is carried by the side bars 2, the yoke being located to the rear of the hopper 5. The lowermost portion of the yoke 21 supports a thrust bearing 22, in which is journaled for rotation, the lower end of a vertically disposed actuating shaft 23, the upper end of which is rotatable within a bearing bracket 24, secured to the rear portion of the hopper 5. The actuating shaft 23 includes a polygonal portion 25. As shown, the polygonal portion 25 takes the form of a sleeve, keyed to the actuating shaft as shown at 26 in Fig. 4; although the manner of forming the polygonal portion 25 upon the shaft 23 is of no great moment. A retractile spring 27 is assembled with the rear end of the arm 16 of the distributer, the spring 27 being connected with one of the side bars 2 of the frame. The function of the spring 27 is to hold the arm 16 of the distributer yieldingly against the polygonal portion 25 of the actuating shaft 23.

Secured to the actuating shaft 23 is a beveled pinion 28, meshing into a beveled pinion 29, secured to a horizontally disposed auxiliary shaft 30, journaled for rotation in one side of the yoke 21, and in a standard 31 which rises from the lower portion of the yoke, as will be clearly understood upon an inspection of Fig. 3. Secured to the outer end of the auxiliary shaft 30 is a sprocket wheel 32, about which is trained a chain 33, the same being engaged about a wheel 34, carried by the shaft 35 upon which the ground wheel 4 is mounted.

The operation of the device is as follows:—The guano or other material which is to be distributed, is placed within the hopper 5, the material passing from the hopper 5 into the distributer 12, and thence by way of the chute 15 into the shoe 8. When the ground wheel 4 is rotated, the shaft 35 will cause a rotation of the sprocket wheel 34, the sprocket wheel 34 actuating the chain 33, the chain 33 rotating the wheel 32 and the auxiliary shaft 30, the intermeshing pinions 29 and 28 causing a rotation of the actuating shaft 23. Recalling that the arm 16 of the distributer 12 is held against the polygonal portion 25 of the actuating shaft 23, through the medium of the spring 27, it will be seen that when the actuating shaft 23 is rotated, in the manner hereinbefore described, the polygonal portion 25 of the shaft will move the distributer 12 rapidly, to and fro, in a horizontal plane, thus causing the material which is in the distributer to sift into the chute 15, and to pass thence into the shoe 8. When it is desired to increase the amount of material which the distributer 12 discharges into the chute 15, the lever 18 may be manipulated, so as to raise and lower the rear end of the distributer. Obviously, by noting which of the notches in the segment 19 is engaged by the lever 18, the amount of material delivered by the distributer 12 may be accurately determined after some observation and experiment.

Having thus described the invention, what is claimed is:—

1. A device of the class described comprising a frame; a ground wheel thereon; a distributer pivotally supported by the frame; a vertically disposed shaft supported for rotation by the frame and having a vertically disposed polygonal portion adapted to engage the distributer, the distributer being mounted to slide along the polygonal portion to vary the angle of the distributer with respect to the horizontal means connected with the distributer for adjusting the distributer along the polygonal portion; and means for connecting the shaft with the ground wheel.

2. A device of the class described comprising a frame; a ground wheel journaled for rotation on the frame; a horizontally disposed auxiliary shaft for rotation upon the frame; means for connecting the auxiliary shaft operatively with the ground wheel; a vertically disposed actuating shaft supported for rotation by the frame and having an eccentric portion; beveled pinions connecting the auxiliary shaft and the actuating shaft; a distributer pivotally supported by the frame and adapted to bear against the eccentric portion of the actuating shaft, whereby the actuating shaft will impart a reciprocatory movement to the distributer when the actuating shaft is rotated; and means for maintaining the distributer engaged with the eccentric portion of the actuating shaft.

3. A device of the class described comprising a frame; a ground wheel thereon; a distributer pivotally supported by the frame and equipped with a rearwardly extended arm; a vertically disposed shaft supported for rotation by the frame and having an eccentric portion adapted to engage the arm to impart a reciprocatory movement to the distributer, in a horizontal plane; means for operatively connecting the shaft with the ground wheel; and means connected with the arm for raising the distributer.

4. A device of the class described comprising a frame; a ground wheel journaled for rotation upon the frame; a horizontally disposed auxiliary shaft supported for rotation upon the frame; a belt connecting the auxiliary shaft operatively with the ground wheel; a vertically disposed actuating shaft supported for rotation by the frame, and having an eccentric portion; beveled pinions connecting the auxiliary shaft and the actuating shaft; a distributer pivotally supported by the frame and adapted to bear against the eccentric portion of the actuating shaft, whereby the actuating shaft will impart a horizontal reciprocatory movement to the distributer, when the actuating shaft is rotated; and spring means for maintaining the distributer engaged with the eccentric portion of the actuating shaft.

5. A device of the class described comprising a frame; a ground wheel thereon; a hopper supported upon the frame; a distributer pivotally mounted beneath the hopper; a chute into which the distributer protrudes; a frame-supported two part shoe between the parts of which the chute discharges; a vertically disposed actuating shaft supported for rotation by the frame, and having a polygonal portion adapted to engage with the distributer; spring means for maintaining the distributer engaged with the eccentric portion of the shaft; and means for operatively connecting the shaft with the ground wheel.

In testimony that I claim the foregoing as my own, I have hereto affixed my signature in the presence of two witnesses.

ALONZO H. PENCE.

Witnesses:
THOMAS J. MORROW,
GARLAND W. STEWART.

Copies of this patent may be obtained for five cents each, by addressing the "Commissioner of Patents, Washington, D. C."